(12) United States Patent
Jacob et al.

(10) Patent No.: US 7,393,283 B2
(45) Date of Patent: Jul. 1, 2008

(54) RZEPPA JOINT

(75) Inventors: Werner Jacob, Frankfurt am Main (DE); Martin D. Jacob, Braunschweig (DE)

(73) Assignee: Shaft-Form-Engineering GmbH, Mühlheim am Main (DE)

( * ) Notice: Subject to any disclaimer, the term of this patent is extended or adjusted under 35 U.S.C. 154(b) by 284 days.

(21) Appl. No.: 10/530,782

(22) PCT Filed: Jul. 23, 2003

(86) PCT No.: PCT/EP03/08020

§ 371 (c)(1), (2), (4) Date: Apr. 7, 2005

(87) PCT Pub. No.: WO2004/036076

PCT Pub. Date: Apr. 29, 2004

(65) Prior Publication Data

US 2006/0166751 A1    Jul. 27, 2006

(30) Foreign Application Priority Data

Oct. 17, 2002    (DE) ................................ 102 48 372

(51) Int. Cl.
*F16D 3/224* (2006.01)

(52) U.S. Cl. ....................... 464/145; 464/906
(58) Field of Classification Search ................ 464/145, 464/906; 403/57
See application file for complete search history.

(56) References Cited

U.S. PATENT DOCUMENTS

| 3,475,924 | A | * | 11/1969 | Aucktor | .................. 464/145 X |
| 5,221,233 | A | | 6/1993 | Jacob | |
| 5,222,914 | A | * | 6/1993 | Mazziotti | ................ 464/145 X |

FOREIGN PATENT DOCUMENTS

| DE | 37 10 518 C1 | 7/1988 |
| DE | 37 39 927 A1 | 6/1989 |
| DE | 40 31 819 C1 | 3/1992 |
| DE | 198 37 471 A1 | 2/2000 |
| DE | 199 05 451 C2 | 9/2000 |
| GB | 2 203 220 A | 10/1998 |
| GB | 2 347 730 A | 9/2000 |

OTHER PUBLICATIONS

International Search Report, PCT/EP03/08020, Oct. 29, 2003.

* cited by examiner

*Primary Examiner*—Greg Binda
(74) *Attorney, Agent, or Firm*—Collard & Roe, P.C.

(57) ABSTRACT

An Rzeppa joint 1 comprises an inner hub 4, an outer hub 7 and a cage 5, which is guided between the two and which holds a number of balls 6 inside radial openings 8. The aim of the invention is to facilitate the assembly of the Rzeppa joint 1. To this end, the inner hub 4 is provided with a first element 10a, 10b and with a second element 11a, 11b that are located, in essence, one behind the other along the inner hub axis 4.

7 Claims, 2 Drawing Sheets

Section II - II

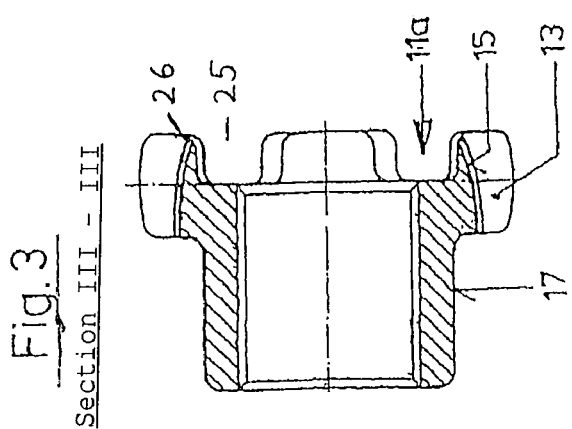
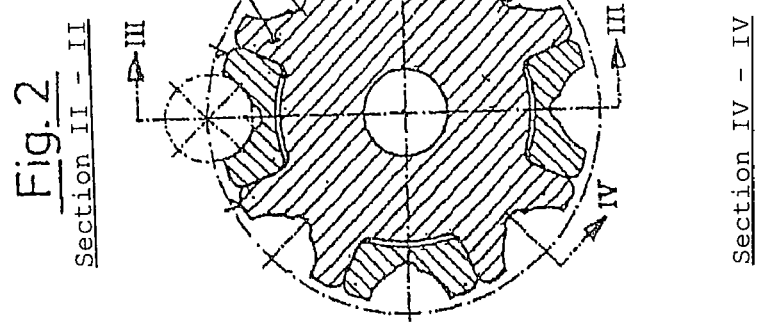
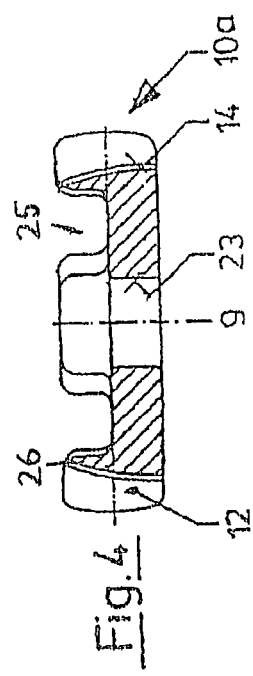
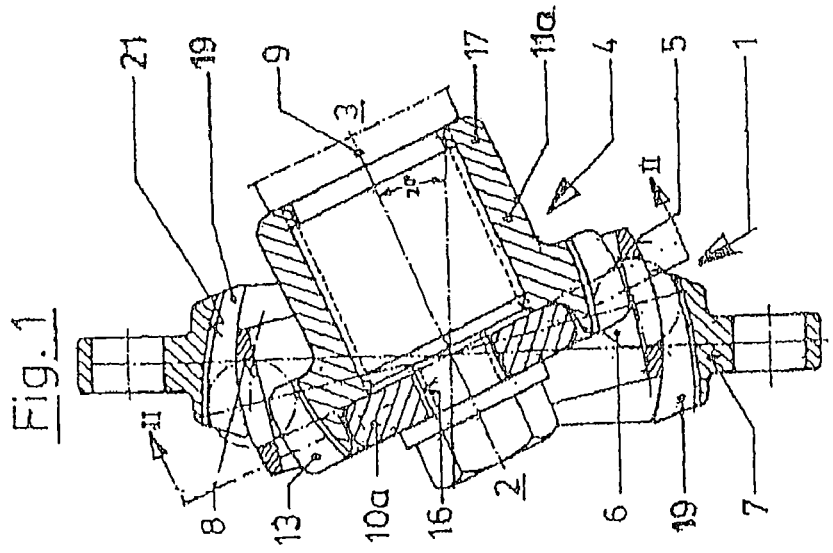

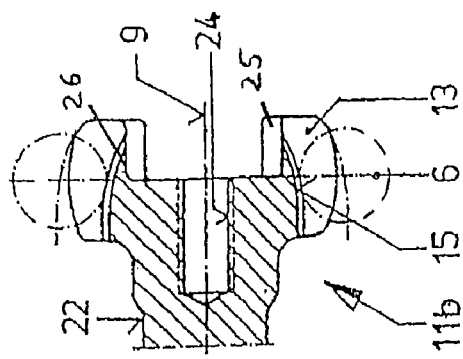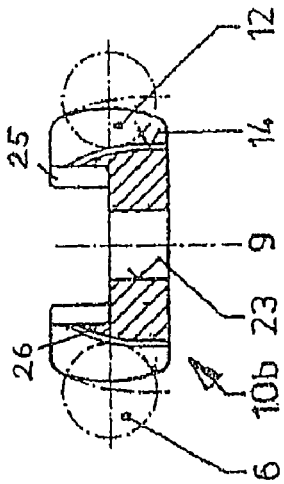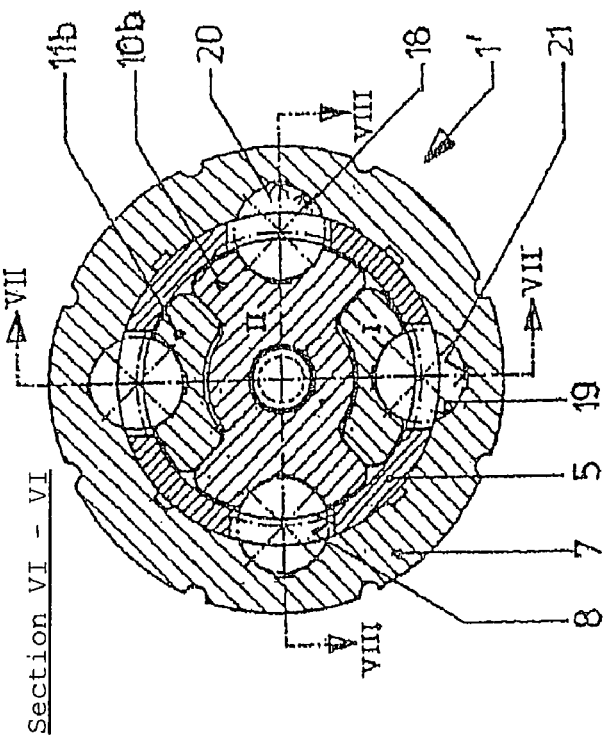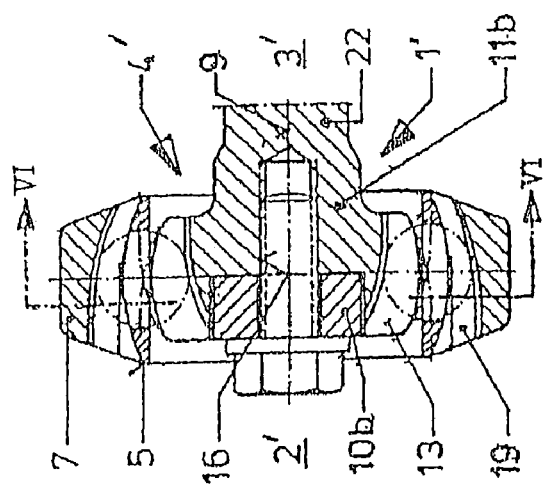

RZEPPA JOINT

CROSS REFERENCE TO RELATED APPLICATIONS

Applicants claim priority under 35 U.S.C. §119 of German Application No. 102 48 372.8 filed Oct. 17, 2002. Applicants also claim priority under 35 U.S.C. §365 of PCT/EP2003/008020 filed Jul. 23, 2003. The international application under PCT article 21(2) was not published in English.

BACKGROUND OF THE INVENTION

The invention relates to a Rzeppa joint, which is used as a synchronous joint, for example as a steering joint or to be connected to the longitudinal shaft of a motor vehicle.

1. Field Of The Invention

Such a Rzeppa joint, which is known from DE 199 05 451 C2, for example, has an inner hub and an outer hub, between which an essentially ring-shaped cage is guided. Running grooves assigned to one another in pairs, in each instance, are made both in the inner hub and in the outer hub; balls that are accommodated in the cage are held to be displaced in these grooves. In this connection, the track base of the pairs of running grooves assigned to one another, in the inner hub and the outer hub, approach one another, alternately, proceeding from a first end of the Rzeppa joint in the direction of the second end, and proceeding from the second end in the direction of the first end.

In this known Rzeppa joint, the balls are individually inserted, manually, into the cage and the pairs of running grooves. This is connected with a significant expenditure of time, which has negative effects on the economic efficiency of the production of the joint.

2. The Prior Art

SUMMARY OF THE INVENTION

Therefore it is the task of the present invention to make available a Rzeppa joint of the type described initially, which can be assembled more quickly and more simply and therefore also with greater economic efficiency.

According to the invention, this task is accomplished in that the inner hub comprises at least two elements that are connected with one another, which essentially lie one behind the other on the inner hub axis. In this connection, a first one of these elements has the first inner running grooves of the inner hub, while a second element carries the second inner running grooves of the inner hub. In this manner, the cage can be set directly into the outer hub during assembly of the Rzeppa joint, whereby every other ball can already be accommodated in the cage. The other balls can then be set into the cage and the running grooves of the outer hub from the inside. The two elements that jointly form the inner hub are then introduced into the cage, which contains balls, from the two opposite sides of the Rzeppa joint, and connected with one another. It is therefore possible to already insert half of the balls into the outer hub, along with the cage. For the insertion of the remaining balls into the cage, as well, it is not necessary, as before, to move the cage into a suitable insertion position outside the outer hub for each ball. In this manner, assembly of the Rzeppa joint is clearly facilitated.

Preferably, the two elements that jointly form the inner hub are configured with projections and recesses that engage with one another like claws, in each instance, so that the two elements lie against one another with a positive lock in the tangential direction. The torque to be transferred between the outer hub and the inner hub by means of the balls is completely passed into or out of the inner hub, by means of the elements that rest against one another with a positive lock.

In order to assure a good connection of the two elements that form the inner hub also in the axial direction, these can be screwed to one another. For this purpose, one of the elements forming the inner hub is provided with a central passage bore, for example, while the other element has a threaded bore that is coaxial with this passage bore.

The production of the two elements that form the inner hub is possible with particularly great precision if the two elements are solid formed parts that are machined essentially without cutting. The running grooves and the projections and recesses of the two elements that lie against one another can be made with great accuracy and uniform quality by means of a stamping process, for example. However, it is possible to perform individual machining steps, such as the provision of the passage bore as well as the threaded bore for connecting the two elements with one another, using a production step that involves cutting.

Preferably, one of the two elements that are joined together to form the inner hub is the end of a shaft or of a journal. In this manner, connecting the Rzeppa joint according to the invention to a shaft or the like is facilitated.

Alternatively to this, one of the elements can be formed in one piece with a sleeve, which has an inner profiling for a connection with a shaft end or a journal.

In order to facilitate the insertion of the cage into the outer hub, it is preferred that the number of running grooves in the outer hub and the inner hub is a whole-number multiple of four, in each instance. In this configuration of the Rzeppa joint, running grooves whose track base approaches the central joint axis in the direction of the same end of the Rzeppa joint always lie opposite one another.

BRIEF DESCRIPTION OF THE DRAWINGS

In the following, the invention will be explained in greater detail, using exemplary embodiments and making reference to the drawings.

These show:

FIG. 1 a cross-sectional view of the Rzeppa joint according to a first embodiment, FIG. 2 a cross-section through the inner hub of the Rzeppa joint according to FIG. 1, along the line II-II, FIG. 3 a cross-section through an element of the inner hub according to FIG. 2, along the line III-III, FIG. 4 a cross-section through an element of the inner hub according to FIG. 2, along the line IV-IV, FIG. 5 a cross-section through a Rzeppa joint according to a second embodiment, FIG. 6 a cross-section through the inner hub of the Rzeppa joint according to FIG. 5, along the line VI-VI, FIG. 7 a cross-section through an element of the inner hub according to FIG. 6, along the line VII-VII, and FIG. 8 a cross-section through an element of the inner hub according to FIG. 6, along the line VIII-VIII.

DETAILED DESCRIPTION OF PREFERRED EMBODIMENTS

The Rzeppa joint 1 shown in FIG. 1 to 4 has a first drive side end 2 and a second power take-off side end 3, whereby the term "drive side" and "power take-off side" is used here merely as an example, for a better differentiation of the two ends. Of course, the two ends 2 and 3 are suitable, in the same manner, for being connected with a driving component or a component to be driven.

From the inside to the outside, the Rzeppa joint 1 has an inner hub 4, a cage 5, which is equipped with balls 6, and an outer hub 7. In this connection, the balls 6 are accommodated in windows 8 of the cage 5.

In the embodiment shown, the inner hub is configured in two parts. A first element 10a and a second element 11a are disposed on the central inner hub axis 9, essentially one behind the other. The two elements 10a and 11a, which together form the inner hub 4, are alternately provided with projections 26 and recesses 25, which engage in one another like claws, as shown in the cross-sectional view of FIG. 2. In this connection, the projections of the two elements 10a and 11a rest against one another with a positive lock, in the tangential direction. A first inner running groove 12 is formed in the projections of the first element 10a, in each instance, while second running grooves 13 are provided in the projections of the second element 11a.

In this connection, the first inner running grooves 12 run without an undercut, proceeding from the drive side end 2, in the direction of the power take-off side end 3. In this connection, their track base 14 approaches the inner hub axis 9. In comparison, the second inner running grooves 13 of the element 11a run without an undercut from the drive side end 2, in the direction of the power take-off side end 3, whereby their track base 15 moves away from the inner hub axis 9 in doing so.

The two elements 10a and 11a that form the inner hub 4 are connected with one another in the axial direction by means of a screw connection, using a threaded bolt 16. In addition to the connection of the two elements 10a and 11a in the tangential direction, by means of the projections that rest against one another in the region of the inner running grooves 12 and 13, respectively, additional projections and recesses that engage in one another can be provided to connect the two elements so as to prevent rotation, as is indicated in FIGS. 3 and 4. In a first embodiment, the element 11a is provided with a sleeve-like extension 17 coaxial with it, which projects away from the first element 10a and can be provided with an inner profiling, for example, for a connection with a shaft end or the like, to prevent rotation.

The outer hub 7 is a one-piece, ring-shaped component whose axis coincides with the inner hub axis 9 of the inner hub 4 in the extended position of the Rzeppa joint 1. First and second outer running grooves 18 and 19, respectively, are formed in the inner surface of the outer hub 7, which grooves are disposed regularly and distributed alternately about the outer hub axis. In the finished, assembled state of the Rzeppa joint 1, the first inner running grooves 12 of the inner hub 4 lie opposite first running grooves 18 of the outer hub 7, and second inner running grooves 13 lie opposite the second outer running grooves 19, so that these form a pair of running grooves with one another, in each instance.

In the second embodiment of the Rzeppa joint 1 shown in FIGS. 5 to 8, the fundamental structure is extensively the same as that of the first embodiment described above. In the Rzeppa joint 1 according to the second embodiment, however, only four balls 6 are accommodated in the cage 5, while according to the first embodiment, eight balls 6 are inserted in the pairs of running grooves and the cage 5.

In the second embodiment of the Rzeppa joint 1' shown in FIGS. 5 to 8, the fundamental structure is extensively the same as that of the first embodiment described above. In the Rzeppa joint 1' according to the second embodiment, however, only four balls 6 are accommodated in the cage 5, while according to the first embodiment, eight balls 6 are inserted in the pairs of running grooves and the cage 5.

The Rzeppa joint according to the first embodiment is consequently suitable as a longitudinal shaft joint in motor vehicles, for example, while the Rzeppa joint according to the second embodiment can be used as a steering shaft joint.

In addition, the inner hub 4' is configured as the end of a shaft 22, as is particularly evident from FIGS. 5 and 7. To connect the elements 10b and 11b, which jointly form the inner hub 4', a passage bore 23 is provided in the first element 10b, to allow the threaded bolt 16 to pass through, while a threaded bore 24 is made in the second element 11b of the inner hub 4', into which the threaded bolt 16 can be screwed.

In the following, the assembly of the Rzeppa joint 1, 1', will now be explained, which is the same for the two embodiments shown. First, the cage 5 is introduced into the outer hub 7, in that the axis of the cage 5 is aligned essentially at a right angle to the outer hub axis. If the number of balls 6 that are set into the running grooves of the inner hub 4, 4', and the outer hub 7 is a whole-number multiple of four, a first outer running groove 18 always lies opposite a first outer running groove 18 of the outer hub 7. Two outer running grooves 18 or 19, respectively, that lie opposite one another, therefore point in the same direction with their larger opening, i.e. the end of the running grooves whose track base is farthest removed from the outer hub. In this manner, the cage 5 can be inserted into a pair of outer running grooves and pivoted in the outer hub 7 in such a manner that the axis of the cage lies above that of the outer hub, essentially with the same coverage.

In this position, all the balls 6 can be inserted into the windows 8 of the cage 5 and the running grooves 18 or 19 of the outer hub 7, from the inside. However, it is also possible to introduce the cage 5 into the outer hubs 7 when it already contains part of the balls 6.

Once all the balls 6 have been introduced into the cage 5 and the outer hub 7, respectively, the inner hub 4, 4' is mounted in the Rzeppa joint 1, 1', in that the first element 10a or 10b is guided into the cage 5 from the drive side end 2, 2', while the second element 11a or 11b is inserted into the first element 10a or 10b from the power take-off side end 3, 3' of the Rzeppa joint 1, 1'. The projections of the two elements 10a, 10b and 11a, 11b, respectively, engage in one another like claws in this connection. For axial fixation of the two elements, the threaded bolt 16 is guided through the passage bore 23 of the first element 10a or 10b, and screwed into the threaded bore 24 of the second element 11a or 11b.

The insertion of the two elements 10a, 10b and 11a, 11b, respectively, into the Rzeppa joint 1, 1', is made possible in that the inner running grooves 12 and 13 face in opposite directions with their largest opening, i.e. the end at which the track base most closely approaches the inner hub axis 9. The balls 6 are therefore reliably introduced into the inner running grooves 12 and 13, respectively.

REFERENCE SYMBOL LIST

| | |
|---|---|
| 1 | Rzeppa joint |
| 2 | drive side end |
| 3 | power take-off side end |
| 4 | inner hub |
| 5 | cage |
| 6 | ball |
| 7 | outer hub |
| 8 | cage window |
| 9 | inner hub axis |

-continued

| 10a, 10b | first element of the inner hub 4 |
| --- | --- |
| 11a, 11b | second element of the inner hub 4 |
| 12 | first inner running groove |
| 13 | second inner running groove |
| 14 | track base of the first inner running groove 12 |
| 15 | track base of the second inner running groove 13 |
| 16 | threaded bolt |
| 17 | sleeve |
| 18 | first outer running groove |
| 19 | second outer running groove |
| 20 | track base of the first outer running groove 18 |
| 21 | track base of the second outer running groove 19 |
| 22 | shaft end |
| 23 | passage bore |
| 24 | threaded bore |

The invention claimed is:

1. Rzeppa joint that has a drive side end (2) and a power take-off side end (3), having
   an inner hub (4), which has an inner hub axis (9) and an outer surface in which first running grooves (12) and second running grooves (13) are disposed, distributed alternately about the inner hub axis (9), whereby the first inner running grooves (12) run proceeding from the drive side end (2), in the direction of the power take-off side end (3), and their track base (14) approaches the inner hub axis (9) in doing so, and whereby the second inner running grooves (13) run from the power takeoff side end (3), proceeding in the direction of the drive side end (2), and their track base (15) approaches the inner hub axis (9) in doing so,
   an outer hub (7), which has an outer hub axis and an inner surface in which first running grooves (18) and second running grooves (19) are disposed, distributed alternately about the outer hub axis, whereby the first inner running grooves (12) lie opposite first outer running grooves (18), and the second inner running grooves (13) lie opposite second outer running grooves (19), forming a pair with these, in each instance, whereby the first outer running grooves (18) run proceeding from the drive side end (2), in the direction of the power take-off side end (3), and their track base (20) moves away from the outer hub axis in doing so, and whereby the second outer running grooves (19) run from the power take-off side end (3), proceeding in the direction of the drive side end (2), and their track base (21) moves away from the outer hub axis (16) in doing so,
   a ring-shaped cage (5) that is disposed between the inner hub (4) and the outer hub (7) and has radial windows (8), corresponding to the number of pairs of running grooves (12, 18; 13, 19), in which balls (6) that engage in the running grooves (12, 13, 18, 19) are guided,
   wherein the inner hub (4) comprises at least two elements (10a, 10b, 11a, 11b) that are connected with one another, which lie essentially one behind the other on the inner hub axis (9), and of which a first element (10a, 10b) has the first inner running grooves (12) and a second element (11a, 11b) has the second inner running grooves (13).

2. Rzeppa joint according to claim 1, wherein the two elements (10a, 10b, 11a, 11b) each have projections and recesses that engage like claws in one another, in such a manner that they rest against one another with a positive lock, in the tangential direction.

3. Rzeppa joint according to claim 1, wherein the two elements (10a, 10b, 11a, 11b) are releasably connected with one another by means of a screw connection (16, 24).

4. Rzeppa joint according to claim 1, wherein the two elements (10a, 10b, 11a, 11b) of the inner hub (4) are solid formed parts that are machined essentially without cutting.

5. Rzeppa joint according to claim 1, wherein one of the elements (10a, 10b, 11a, 11b) forms the end of a shaft (22) or a journal.

6. Rzeppa joint according to claim 1, wherein one of the elements (10a, 10b, 11a, 11b) is formed in one piece with a sleeve (17) that has an inner profiling.

7. Rzeppa joint according to claim 1, wherein the number of running grooves (12, 13, 18, 19) in the outer hub (7) and the inner hub (4) is a whole-number multiple of four.

* * * * *